(12) United States Patent
Ishii et al.

(10) Patent No.: US 10,144,479 B2
(45) Date of Patent: Dec. 4, 2018

(54) VEHICLE BODY FRAME STRUCTURE OF STRADDLE-TYPE VEHICLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 234 days.

(21) Appl. No.: 15/034,506

(22) PCT Filed: Nov. 7, 2013

(86) PCT No.: PCT/JP2013/006567
§ 371 (c)(1),
(2) Date: May 4, 2016

(87) PCT Pub. No.: WO2015/068187
PCT Pub. Date: May 14, 2015

(65) Prior Publication Data
US 2016/0264205 A1    Sep. 15, 2016

(51) Int. Cl.
*B62K 11/04* (2006.01)
*B62K 25/28* (2006.01)
(Continued)

(52) U.S. Cl.
CPC ............... *B62K 11/04* (2013.01); *B62H 1/02* (2013.01); *B62K 19/18* (2013.01); *B62K 25/283* (2013.01)

(58) Field of Classification Search
CPC ........ B62K 11/04; B62K 11/84; B62K 19/06; B62K 25/283
(Continued)

(56) References Cited

U.S. PATENT DOCUMENTS

| 4,852,678 A | * | 8/1989 | Yamaguchi | B62K 11/04 180/219 |
| 5,390,758 A | * | 2/1995 | Hunter | B60K 5/1208 180/227 |
| 6,024,185 A | * | 2/2000 | Okada | B62K 11/04 180/227 |

(Continued)

FOREIGN PATENT DOCUMENTS

DE  102008026705 A1  12/2009
EP  0207618 A2  1/1987
(Continued)

OTHER PUBLICATIONS

ISA Japanese Patent Office, International Search Report Issued in Application No. PCT/JP2013/006567, dated Feb. 10, 2014, WIPO, 3 pages.
(Continued)

*Primary Examiner* — Anne Marie M Boehler
(74) *Attorney, Agent, or Firm* — Alleman Hall Creasman & Tuttle LLP

(57) ABSTRACT

Provided is a vehicle body frame structure which can reduce a burden in assembly of a straddle-type vehicle. The structure comprises a head pipe; and a pair of main frames extending rearward from the head pipe and outward in a vehicle width direction such that the main frames are spaced apart from each other in the vehicle width direction. Rear portions of the pair of main frames are detachably coupled to each other in the vehicle width direction via a coupling member. The pair of main frames include a pair of front frame members including respective first mounts to which a drive unit of the vehicle is mounted, and a pair of respective rear frame members located rearward relative to the front frame members. The pair of rear frame members have a stiffness lower than that of the front frame members in the vehicle width direction.

12 Claims, 4 Drawing Sheets

(51) Int. Cl.
*B62H 1/02* (2006.01)
*B62K 19/18* (2006.01)

(58) Field of Classification Search
USPC .................................. 180/227, 228
See application file for complete search history.

(56) References Cited

U.S. PATENT DOCUMENTS

| | | | |
|---|---|---|---|
| 6,523,631 B2 * | 2/2003 | Uneta | B62K 11/04 |
| | | | 180/228 |
| 9,855,989 B2 * | 1/2018 | Hariu | B62K 25/283 |
| 2009/0242305 A1 * | 10/2009 | Asano | B62K 11/04 |
| | | | 180/219 |
| 2013/0154311 A1 * | 6/2013 | Keisuke | B62K 19/06 |
| | | | 296/205 |

FOREIGN PATENT DOCUMENTS

| | | |
|---|---|---|
| JP | H11278346 A | 10/1999 |
| JP | 2000280964 A | 10/2000 |
| JP | 2007131030 A | 5/2007 |
| JP | 2008068858 A | 3/2008 |
| WO | 2005111395 A2 | 11/2005 |

OTHER PUBLICATIONS

European Patent Office, Extended European Search Report Issued in European Application No. 13896995.1, dated Jul. 6, 2017, Germany, 8 pages.
ISA Japanese Patent Office, Written Opinion of the International Searching Authority Issued in Application No. PCT/JP2013/006567, dated Feb. 10, 2014, WIPO, 8 pages.

* cited by examiner

VEHICLE BODY FRAME STRUCTURE OF STRADDLE-TYPE VEHICLE

TECHNICAL FIELD

The present invention relates to a vehicle body frame structure of a straddle-type vehicle such as a motorcycle. In particular, the present invention relates to a vehicle body frame structure including a pair of right and left main frames.

BACKGROUND ART

As disclosed in Patent Literature 1, in a case where a vehicle body frame structure of a straddle-type vehicle includes a pair of main frames, a cross member extending in a vehicle width direction is provided between the main frames to connect the main frames to each other. In general, the cross member is welded to the main frames. Components such as an engine and frame members are mounted to the main frames, and thus the straddle-type vehicle is assembled.

CITATION LIST

Patent Literature

Patent Literature 1: Japanese Laid-Open Patent Application Publication No. 2007-131030

SUMMARY OF INVENTION

Technical Problem

If the main frames have a major dimension error or a major assembling error, it becomes necessary to correct the distortion of the main frames in the assembling of the vehicle. This correction of the main frames may increase a burden in the assembling operation of the vehicle. In a case where the pair of main frames are coupled to each other via the cross member and the cross member is welded to the main frames, the error and the distortion tend to be increased, and a force required for the correction tends to be increased. This may further increase the burden in the assembling operation of the vehicle.

In view of the above, an object of the present invention is to provide a vehicle body frame structure which can reduce the burden in the assembling operation of the vehicle.

Solution to Problem

According to the present invention, a vehicle body frame structure of a straddle-type vehicle comprises a head pipe; and a pair of main frames extending rearward and outward in a vehicle width direction from the head pipe in such a manner that the main frames are spaced apart from each other in the vehicle width direction, wherein rear portions of the pair of main frames are detachably coupled to each other in the vehicle width direction via a coupling member, wherein the pair of main frames include a pair of front frame members including first mounts, respectively, to which a drive unit of the vehicle is mounted, and a pair of rear frame members located rearward relative to the front frame members, respectively, and wherein the pair of rear frame members have a stiffness lower than that of the front frame members in the vehicle width direction.

In accordance with this configuration, the front frame members can have a stiffness required to mount the drive unit, while the rear frame members are easily deflected. Even if the main frames have a dimension error or an assembling error, devices and members can be easily mounted to the main frames, by deflecting and deforming the rear frame members. Therefore, a burden in the assembling operation, which would be caused by the correction of the main frames, can be reduced.

Each of the pair of front frame members may include a plurality of rod-like frames placed in different directions, the plurality of rod-like frames of one of the front frame members and the plurality of rod-like frames of the other front frame member are arranged along a pair of virtual planes extending rearward from the head pipe to be spaced apart from each other in the vehicle width direction from the head pipe, and the plurality of rod-like frames of each of the pair of front frame members may be coupled to each other to form a trellis structure, and each of the pair of rear frame members may be constituted by a single rod-like frame extending rearward linearly from the front frame member.

In accordance with this configuration, it becomes possible to obtain the vehicle body frame structure in which its front portion has a stiffness and its rear portion is flexible. The front portion of the vehicle body frame structure has a trellis structure to provide the stiffness. In this way, the vehicle body frame structure can achieve the stiffness and a light weight.

The pair of rear frame members may extend independently of each other in such a manner that the rear frame members are permitted to be deformed inward in the vehicle width direction.

In accordance with this configuration, since the pair of rear frame members are not firmly joined to each other and are independent of each other, the rear frame members can be easily deflected and deformed. This makes it possible to reduce a burden in the assembling operation of the straddle-type vehicle.

The drive unit may include a second mount located rearward relative to the front frame members, and at least one of a rear suspension and a swing arm may be directly or indirectly coupled to the second mount.

In accordance with this configuration, when an impact generated from a road surface is imparted to the main frames via the rear suspension or the swing arm, this impact is more likely to be transmitted to the front frame members having a high stiffness, and is less likely to be transmitted to the rear frame members having a low stiffness. Therefore, the impact generated from the road surface can be received by the entirety of the main frames even though the stiffness of the rear frame members is low.

Each of the rear frame members may be placed between the first mount and the second mount in a vehicle length direction.

In accordance with this configuration, the impact transmitted in a forward direction to the rear frame members can be mitigated.

Each of the front frame members may include an upper frame extending rearward from an upper portion of the head pipe, a lower frame extending rearward from a lower portion of the head pipe, and a connection frame connecting the upper frame to the lower frame substantially vertically, and each of the rear frame members may extend continuously rearward from one of the upper frame and the lower frame.

In accordance with this configuration, it becomes possible to obtain a structure in which the stiffness of the rear frame members is lower than that of the front frame members, and form a wide space in a region which is above or below (below in a case where the rear frame members are continuous from the upper frames, respectively) the rear frame members. Therefore, devices can be easily arranged in this wide space.

Each of the first mounts may be placed at an intermediate portion of each of the front frame members in a vehicle length direction.

In accordance with this configuration, for example, the drive unit can be supported by use of the entirety of the front frame members having the trellis structure for providing the high stiffness, compared to a case where the first mounts are placed at the front ends or rear ends of the front frame members.

Each of the first mounts may include a plurality of first mount members which are placed to be spaced apart from each other.

In accordance with this configuration, by increasing the locations at which the drive unit is mounted to the front frame members, the drive unit can be stably mounted to the main frames. In addition, the drive unit easily functions as a frame reinforcement member, and the vehicle body frame structure can be simplified. As described above, a burden in the assembling operation of the straddle-type vehicle is reduced. Therefore, a burden in the assembling operation is not increased, even though the number of locations at which the drive unit is mounted to the front frame members increases.

The pair of main frames may include a pair of pivot bracket members extending downward from rear end portions of the rear frame members, respectively, and a rear portion of the drive unit may be mounted to the pivot bracket members.

The coupling member may be placed between the pair of pivot bracket members and detachably coupled to the pair of pivot bracket members, and the rear portion of the drive unit may be fastened to the coupling member by use of a fastener member inserted into the coupling member in a vehicle length direction.

Advantageous Effects of Invention

In accordance with the present invention, it becomes possible to provide a vehicle body frame structure which can reduce a burden in the assembling operation of the vehicle.

DESCRIPTION OF EMBODIMENTS

Figure 1:
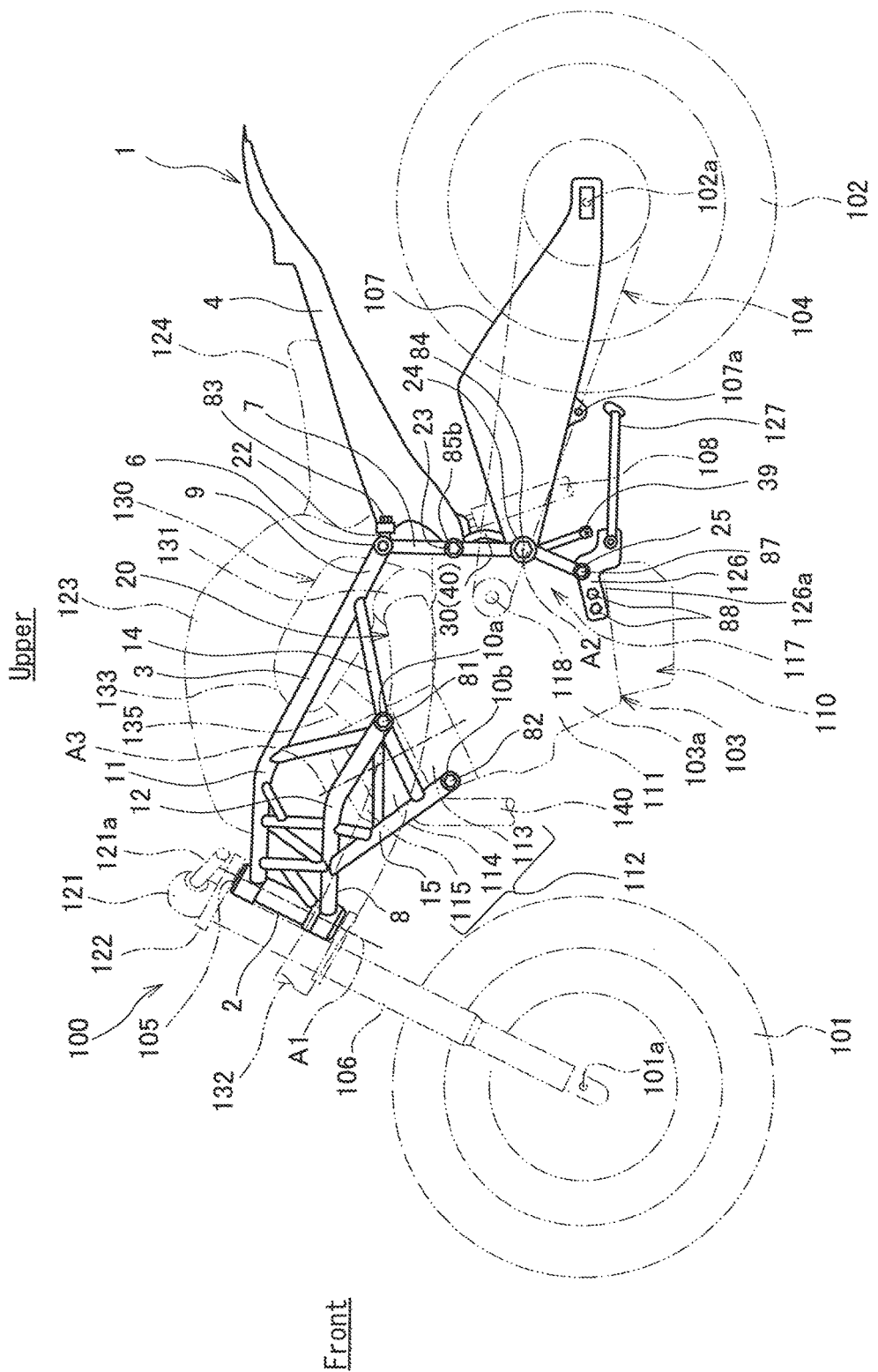
FIG. 1 is a left side view of a motorcycle which is an exemplary straddle-type vehicle which is incorporated into a vehicle body frame structure according to an embodiment.

Hereinafter, the embodiment will be described with reference to the accompanying drawings. Throughout the drawings, the same or corresponding components are designated by the same reference characters, and will not be described repeatedly. The directions stated below are from the perspective of a rider straddling the straddle-type vehicle incorporating a vehicle body frame structure of the present invention. A vehicle height direction, a vehicle length direction, and a vehicle width direction correspond to a vertical direction, a forward and rearward direction, and a rightward and leftward direction, respectively. The terms "outside" and "outward" in the vehicle width direction refer to a side and a direction, respectively, which are more distant from the center of a vehicle body in the vehicle width direction. The terms "inside" and "inward" in the vehicle width direction refer to a side and a direction, respectively, which are closer to the center of the vehicle body in the vehicle width direction.

FIG. 1 is a left side view of a motorcycle 100 which is an exemplary straddle-type vehicle which is incorporated into a vehicle body frame structure according to an embodiment. First of all, the configuration of the motorcycle 100 will be described in brief. As shown in FIG. 1, the motorcycle 100 includes a front wheel 101, a rear wheel 102, a drive unit 103, and a driving power transmission mechanism 104.

The front wheel 101 is mounted to a vehicle body frame 1 via a steering component such as a steering shaft 105 in such a manner that the direction of the front wheel 101 is changeable around a steering axis A1. The steering axis A1 extends substantially upward and is inclined rearward to form a caster angle. In the present embodiment, the steering component includes a front fork 106. A front axle 101a of the front wheel 101 is rotatably mounted to the lower end portion of the front fork 106.

The rear wheel 102 is mounted to the vehicle body frame 1 via a swing arm 107 in such a manner that the rear wheel 102 is pivotable around a pivot axis A2. The pivot axis A2 extends in the vehicle width direction. The rear wheel 102 is placed rearward relative to the vehicle body frame 1. The swing arm 107 is pivotally mounted at a front end portion thereof to the vehicle body frame 1. The rear end portion of the swing arm 107 supports the right and left sides of a rear axle 102a of the rear wheel 102 in such a manner that the rear axle 102a is rotatable. A rear suspension 108 is placed between the vehicle body frame 1 and the swing arm 107 and connects the vehicle body frame 1 and the swing arm 107 to each other. A lever structure (not shown) is provided between the swing arm 107 and the rear suspension 108. The lever structure is supported on each of the vehicle body frame 1 and the swing arm 107 in such a manner that the lever structure is angularly displaceable. Reference character 107a indicates a support hole via which the lever structure is angularly displaceably supported on the lower portion of the swing arm 107. Reference character 39 indicates a support hole via which the lever structure is angularly displaceably supported on the vehicle body (e.g., a coupling member 30 which will be described later).

The rear wheel 102 is a drive wheel. The drive unit 103 includes a driving power source which generates rotational driving power. The driving power transmission mechanism 104 serves to transmit the rotational driving power output from the driving power source to the rear axle 102a. This allows the rear wheel 102 to be rotated with the rotational driving power generated by the driving power source. A casing member 103a of the drive unit 103 is mounted to the vehicle body frame 1.

The drive unit 103 includes an engine 110 which is an example of the driving power source. The drive unit 103 includes a crankcase 111 and a cylinder assembly 112 which are examples of the casing member 103a. The cylinder assembly 112 includes a cylinder block 113, a cylinder head 114, and a head cover 115. A crankshaft is rotatably supported on the crankcase 111. The cylinder assembly 112 accommodates therein a piston and a valve operating system and constitutes a combustion chamber. The cylinder block 113 is joined to the crankcase 111. The cylinder block 113 accommodates therein the piston in such a manner that the piston is reciprocatable in a direction of a cylinder axis A3. The cylinder head 114 is joined to the cylinder block 113 on an opposite side of the crankcase 111 in the direction of the cylinder axis A3, and constitutes the combustion chamber. The head cover 115 covers the cylinder head 114 on an opposite side of the cylinder block 113 in the direction of the cylinder axis A3. The head cover 115 and the cylinder head 114 accommodate therein the valve operating mechanism on the opposite side of the cylinder block 113.

The engine 110 is placed to extend horizontally, and the crankshaft of the engine 110 extends in the vehicle width direction. The engine 110 has an L-shape. The single cylinder assembly 112 is joined to the front upper portion of the crankcase 111, and the cylinder axis A3 extends upward from the front upper portion (more specifically, the cylinder axis A3 extends to be inclined slightly forward). The engine 110 is an in-line multi-cylinder engine. The cylinder axes A3 of the cylinders overlap with each other when viewed from a side. The cylinder assembly 112 is relatively elongated in the vehicle width direction.

The drive unit 103 includes a transmission as an example of a device which is integrated with the driving power source as a unit, and transmits the rotational driving power output from the driving power source to the rear wheel 102. The crankcase 111 protrudes rearward from the perspective of the cylinder assembly 112. The rear portion of the crankcase 111 constitutes a transmission case 117 which accommodates the transmission therein. The transmission changes the rotational driving power output from the driving power source, and outputs the changed rotational driving power to a transmission output shaft 118. The first end portion (e.g., left end portion) of the transmission output shaft 118 in the vehicle width direction protrudes outward in the vehicle width direction from the side wall (e.g., left side wall) of the transmission case 117, the side wall being on a first side in the vehicle width direction.

The driving power transmission mechanism 104 is engaged with the first end portion (e.g., left end portion) of the transmission output shaft 118 in the vehicle width direction and the first end portion (e.g., left end portion) of the rear axle 102b in the vehicle width direction. The driving power transmission mechanism 104 extends in the vehicle length direction from the drive unit 103 toward the rear wheel 102. The driving power transmission mechanism 104 is placed on the first side (e.g., left side) in the vehicle width direction, with respect to a center line of the vehicle body in the vehicle width direction. The driving power transmission mechanism 104 is, for example, a chain transmission mechanism.

Next, the vehicle body frame structure according to the present embodiment which is suitably applied to the motorcycle 100 having the above-described configuration will be described. As shown in FIG. 1, the vehicle body frame 1 includes a head pipe 2, a main frame 3, and a rear frame 4.

Figure 2:
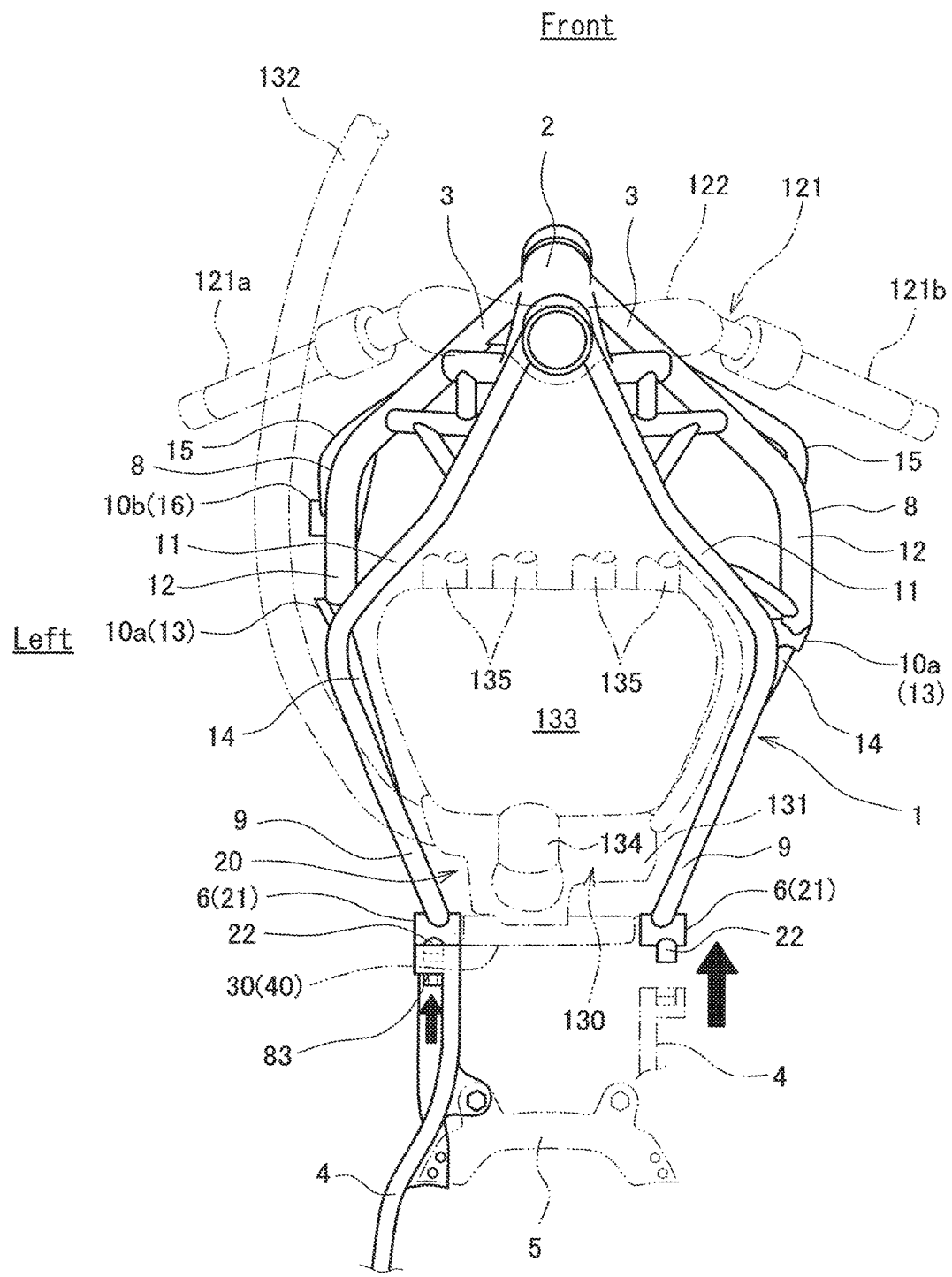
FIG. 2 is a plan view of the vehicle body frame structure of FIG. 1.

The head pipe 2 is made of metal and has a cylindrical shape with both ends opened. The head pipe 2 is located at the front end portion of the vehicle body frame 1. The above-described steering shaft 105 is connected to a handle 121 and is inserted into the head pipe 2. The steering shaft 105 is placed coaxially with the head pipe 2. The common axis of the steering shaft 105 and of the head pipe 2 constitutes the above-described steering axis A1. The steering shaft 105 is supported by the head pipe 2 in such a manner that the steering shaft 105 is rotatable around the steering axis A1. The upper end of the steering shaft 105 is coupled to the lower surface of a bracket 122. The handle 121 is attached to the upper surface of the bracket 122. The handle 121 includes a pair of grips 121a, 121b (the right grip 121b is shown in FIG. 2) protruding to the left and the right, respectively. When the rider grips the grips 121a, 121b and rotates the handle 121, the steering shaft 105 is rotated around the steering axis A1, and thus the direction of the front wheel 101 is changed.

The main frame 3 extends rearward from the head pipe 2. The rear frame 4 is connected to the main frame 3, and extends rearward from the main frame 3. In the present embodiment, the main frame 3 includes a pair of main frames placed in the vehicle width direction, while the rear frame 4 includes a pair of rear frames placed in the vehicle width direction. A fuel tank 123 is placed over the main frames 3 and located rearward relative to the handle 121. A seat 124 is placed over the rear frames 4 and placed rearward relative to the fuel tank 123.

FIG. 2 is a plan view of the vehicle body frame structure of FIG. 1. As shown in FIG. 2, the pair of main frames 3 are welded to the head pipe 2, and extend rearward and outward in the vehicle width direction, from the head pipe 2 in such a manner that the main frames 3 are spaced apart from each other in the vehicle width direction. Each of the main frames 3 includes a plurality of rod-like frame members which are joined to each other. The rod-like frame members extend linearly (in a straight-line shape or a curved-line shape) and have a hollow structure made of metal. The rod-like frame members are directly welded to each other, or welded to joint members. The joint members are tubular members or pipe members having center axes, respectively, extending in the vehicle width direction. The outer peripheral surface of each of the joint members is welded to the end portion(s) of one or more rod-like frame members.

The pair of rear frames 4 are independently manufactured. Each of the rear frames 4 is a molded (cast) product made of a metal material (e.g., aluminum alloy) different from that of the main frames 3. The material of the rear frames 4 is chosen irrespective of the main frames 3, in view of ease of molding, and lightness of weight. The pair of rear frames 4 manufactured in this way are independently detachably coupled to the corresponding main frames 3, respectively, by use of fastener members such as bolts. The left rear frame 4 is coupled to the rear portion of the left main frame 3 and extends rearward from the rear portion of the left main frame 3. The front end portion of the left rear frame 4 is fastened to the left main frame 3 at two locations which are spaced apart from each other in a direction (namely, the vehicle height direction and the vehicle length direction) which is perpendicular to the vehicle width direction. The right rear frame 4 is fastened to the right main frame 3 in the same manner. The pair of rear frames 4 are coupled to the main frames 3, respectively, and then are coupled to each other in the vehicle width direction via a cross plate 5. The cross plate 5 is placed between the pair of rear frames 4, and detachably coupled to the center portions of the pair of rear frames 4 in the vehicle length direction, by use of fastener members such as bolts.

Each of the main frames 3 includes a rearward extension section extending rearward from the head pipe 2, a bent section 6 located at the rear end portion of the rearward extension section, and a downward extension section (pivot bracket member) 7 extending downward from the bent section 6. The rearward extension section includes a front frame member 8 including first mounts 10a, 10b to which the drive unit 103 (see FIG. 1) is mounted, and a rear frame member 9 located rearward relative to the front frame member 8. The bent section 6 is provided at the rear end portion of the rear frame member 9. The first mounts 10a, 10b are provided at plural locations which are spaced apart from each other. In the present embodiment, the first mount includes the upper first mount 10a and the lower first mount 10b. The upper first mount 10a and the lower first mount 10b are provided at two locations which are spaced apart from each other in the vehicle height direction and in the vehicle length direction. In the present embodiment, the main frame 3 includes the pair of main frames 3 placed in the vehicle width direction. Each of the main frames 3 includes the upper first mount 10a and the lower first mount 10b. In brief, the pair of main frames 3 include four first mounts in total.

The pair of main frames 3 are not joined to each other by a cross member extending in the vehicle width direction. The pair of main frames 3 extend rearward independently of each other, from the head pipe 2. The rear portions (downward extension sections 7) of the pair of main frames 3 are detachably coupled to each other by the coupling member 30. The front portion of the coupling member 30 is fastened to the rear portion of the casing member 103a of the drive unit 103. The coupling member 30 is a member which separates the rear end portion of the drive unit 103 from the rear suspension 108. Therefore, the coupling member 30 may be assumed as a part of the drive unit 103. Also, the coupling member 30 serves as a bracket or a stay by which the rear portion of the drive unit 103 is coupled to the main frames 3. Therefore, the coupling member 30 may be assumed as a part of the vehicle body frame 1. The coupling member 30 is used to support various components such as the swing arm 107, the pair of rear frames 4, the rear suspension 108, a lever structure (not shown), etc., as well as the casing member 103a. The structure of the coupling member 30 will be described later.

The stiffness of the rear frame members 9 in the vehicle width direction is lower than that of the front frame members 8. The front frame members 8 are not joined together by the cross member, and therefore are flexible. However, the stiffness of the front frame members 8 is higher than that of the rear frame members 9. The rear frame members 9 are more easily deflected in the vehicle width direction than the front frame members 8 are. This makes it possible to ensure the stiffness required to mount the drive unit 103 by the front frame members 8 each including the first mounts 10a, 10b, and ensure the flexibility of the main frames 3. If a distortion occurs in the main frames 3, in a case where the main frames 3 are constructed by welding the rod-like frame members to each other, the correction of the main frames 3 can be easily performed by deflecting the rear frame members 9, or other members which are in the vicinity of the rear frame members 9, when the drive unit 103 is mounted to the main frames 3. Therefore, a burden in the assembling operation of the motorcycle 100 can be reduced without significantly increasing the dimension accuracy of the main frames 3.

Figure 3:
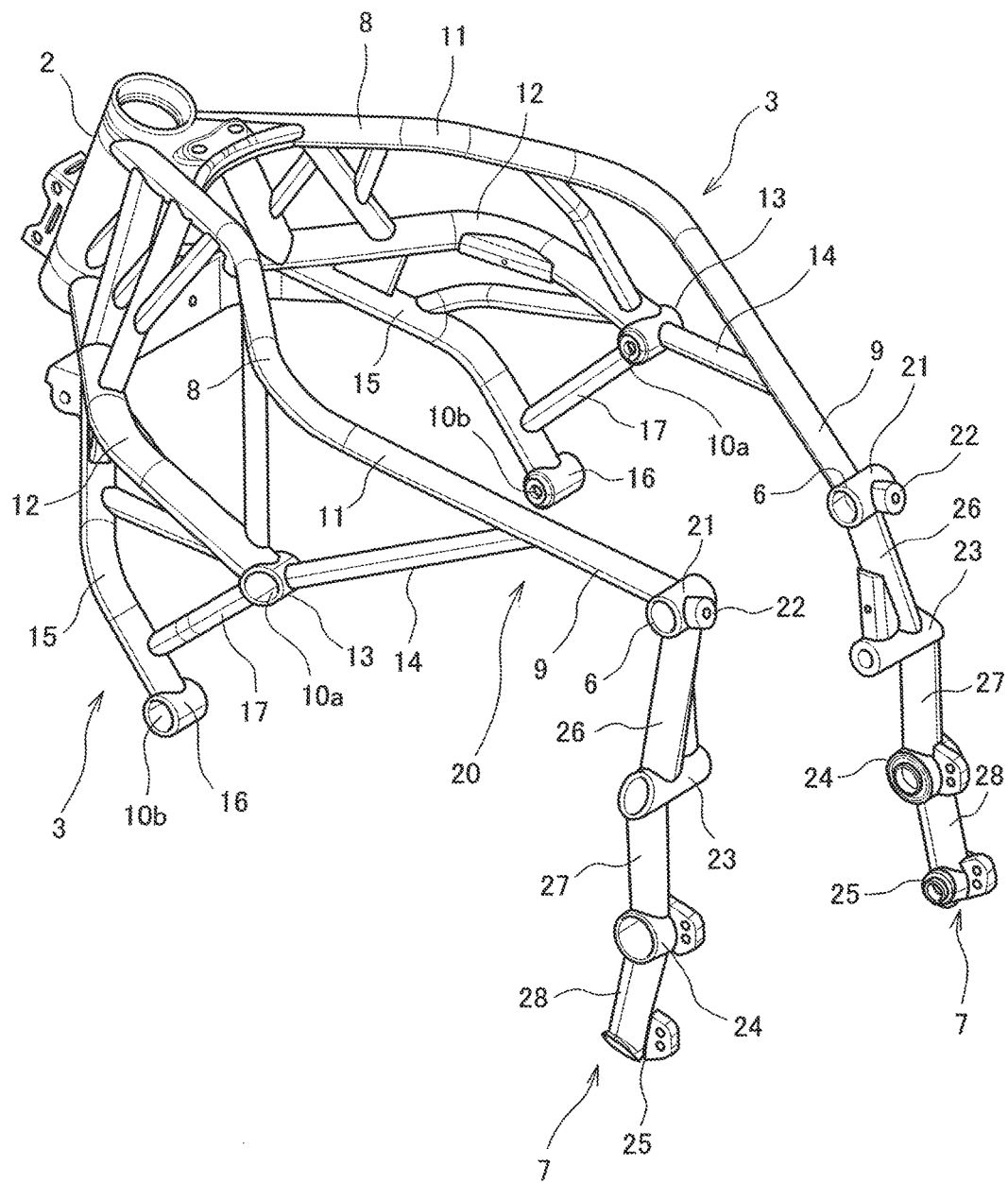
FIG. 3 is a perspective view of main frames.

FIG. 3 is a perspective view of the main frames 3. As shown in FIG. 3, each of the front frame members 8 includes the plurality of rod-like frame members to form a trellis structure. More specifically, each of the pair of front frame members 8 includes the plurality of rod-like frame members placed in different directions and coupled to each other, and the plurality of rod-like frame members of one of the front frame members 8 and the plurality of rod-like frame members of the other front frame member 8 are arranged along a pair of virtual planes placed to be spaced apart from each other in the vehicle width direction from the head pipe 2. Each of the rod-like frame members extends linearly. The plurality of rod-like frame members are coupled to each other to form a lattice structure on each of the virtual planes.

Each of the rear frame members 9 comprises a single rod-like frame member extending linearly (in a straight-line shape or a curved-line shape) rearward from the rear end of the corresponding front member 8.

The virtual planes extend substantially in the vehicle height direction and in the vehicle length direction. The virtual planes may be flat planes or curved planes which are twisted around axes extending in the vehicle height direction, in the vehicle length direction, in the vehicle width direction, or in directions which are inclined with respect to the vehicle height direction, the vehicle length direction, and the vehicle width direction. The virtual planes protrude in the outward direction of the vehicle width direction, as they extend in the downward direction. Since the virtual planes protrude in the outward direction in this way, they are inclined in the outward direction of the vehicle width direction, as they extend in the downward direction. Or, the virtual planes are twisted around the axes extending in the vehicle length direction in such a manner that their upper portions are located inward in the vehicle width direction relative to their lower portions. In addition, the virtual planes protrude in the outward direction of the vehicle width direction, as they extend in the rearward direction. Since the virtual planes protrude in the outward direction in this way, they are inclined in the outward direction of the vehicle width direction, as they extend in the forward direction. Or, the virtual planes are twisted around the axes extending in the vehicle height direction in such a manner that their front portions are located inward in the vehicle width direction relative to their rear portions. Since the rod-like frame members are arranged along the above-described virtual planes, these members need not extend in the straight line shape but may be suitably curved.

Each of the front frame members 8 includes an upper frame 11 extending rearward from the upper portion of the head pipe 2, and a lower frame 12 extending rearward from the lower portion of the head pipe 2. The terminal (rear) end of one of the upper and lower frames 11, 12 is located in front of that of the other of the upper and lower frames 11, 12. Each of the rear frame members 9 extends rearward from the rear end of the front frame member 8 as described above, and rearward from the other of the upper and lower frames 11, 12.

In the present embodiment, the terminal end of the lower frame 12 is located in front of that of the upper frame 11. Therefore, the rear frame member 9 extends rearward from the upper frame 11. One of the rod-like frame members included in the upper frame 11 also constitutes the rear frame member 9. Thus, the upper frame 11 and the rear frame member 9 are integrated as the common member.

A tubular joint member 13 is provided at the rear end of the lower frame 12. The rear end portion of the rod-like frame member constituting the lower frame 12 is welded to the outer peripheral surface of the joint member 13. A gusset frame 14 is welded to the joint member 13. The gusset frame 14 extends rearward and upward from the joint member 13 and is joined to the upper frame 11 or the rear frame member 9 (to be precise, the rod-like frame member constituting the upper frame 11 or the rear frame member 9). The gusset frame 14 constitutes the trellis structure together with the upper frame 11 and the lower frame 12, and may be assumed as a part of the front frame member 8.

The joint member 13 provided at the rear end of the lower frame 12 also functions as the upper first mount 10a. The front frame member 8 includes an arm frame 15 extending downward and rearward from the front end portion of the lower frame 12. A tubular joint member 16 which functions as the lower first mount 10*b* is provided at the rear end of the arm frame 15. The lower first mount 10*b* is located below the upper first mount 10*a*. The lower first mount 10*b* is also spaced apart from the upper first mount 10*a* in the vehicle length direction. In the present embodiment, the lower first mount 10*b* is located in front of the upper first mount 10*a*. A coupling frame 17 extends downward from the joint member 16 constituting the upper first mount 10*a*. The coupling frame 17 is joined to the rear end portion of the arm frame 15.

In addition, each of the front frame members 8 includes a connection frame connecting the upper frame 11 to the lower frame 12, and a connection frame connecting the lower frame 12 to the arm frame 15. Because of the presence of the connection frames, each of the front frame members 8 is configured in such a manner that a plurality of triangles are arranged between the upper frame 11 and the lower frame 12, or between the lower frame 12 and the arm frame 15, along the virtual plane in the vehicle length direction. In this structure, the pair of front frame members 8 can ensure a stiffness required to mount the drive unit 103, while ensuring flexibility without using the cross member. Since the trellis structure is used to provide a sufficient stiffness, the vehicle body frame 1 can achieve a sufficient stiffness and a light weight.

Turning back to FIG. 1, the first mounts 10*a*, 10*b* are fastened to the cylinder assembly 112 of the engine 110 by use of fastener members such as bolts inserted into the first mounts 10*a*, 10*b*, from outside in the vehicle width direction. The cylinder assembly 112 is located between the pair of front frame members 8 in the vehicle width direction. The upper first mount 10*a* is fastened to the rear end portion of the side wall of the cylinder assembly 112 (e.g., cylinder head 114) by use of a fastener member 81 inserted into the upper first mount 10*a* from outside in the vehicle width direction. The lower first mount 10*b* is fastened to the front end portion of the side wall of the cylinder assembly 112 (e.g., cylinder block 113) by use of a fastener member 82 inserted into the lower first mount 10*b* from outside in the vehicle width direction.

Since the first mounts 10*a*, 10*b* are placed at plural locations which are spaced apart from each other, the drive unit 103 is mounted to the front frame members 8 at more locations. This makes it possible to stably mount the drive unit 103 to the main frames 3. In addition, the drive unit 103 can easily serve as a reinforcement member for the vehicle body frame 1. In other words, the vehicle body frame 1 (to be precise, the rearward extension sections of the main frames 3) can be simplified, and hence the flexibility of the vehicle body frame 1 can be ensured.

In a case where the gusset frame 14 is assumed as a part of each of the front frame members 8 as described above, the first mounts 10*a*, 10*b* are placed at the intermediate portion of the front frame member 8 in the vehicle length direction. For example, compared to a case where the first mounts are placed at the front end or rear end of each of the front frame members 8, the drive unit 103 can be supported by use of the whole of the front frame members 8 configured to have a sufficient stiffness.

As described above, the rear frame member 9 is constituted by the single rod-like frame member extending linearly from the front frame member 8. The pair of rear frame members 9 are not joined to each other by the cross member, as in the front frame members 8. The pair of rear frame members 9 extend independently of each other in such a manner that they are permitted to be deformed inward in the vehicle width direction. For this reason, even when four fastening locations are set in the cylinder assembly 112, the main frames 3 can be easily corrected so that all of the fastening locations overlap with the corresponding first mounts, respectively, when viewed from the side.

As described above, the terminal end of one of the upper and lower frames 11, 12 is located in front of that of the other of the upper and lower frames 11, 12, and the rear frame member 9 extends linearly rearward from other of the upper and lower frames 11, 12. In this layout, above and below each of the rear frame members 9, a device space 20 which is widely opened to the side is formed. In the present embodiment, since the rear frame member 9 is continuous with the upper frame 11, the device space 20 is provided below the rear frame member 9.

In a state in which the vehicle body frame 1 is incorporated into the motorcycle 100, the device space 20 is located above the crankcase 111 and rearward relative to the cylinder assembly 112. Since the lower frame 12 terminates at a relatively front position, the device space 20 is widely opened to the side. Any devices may be placed in the device space 20. In the device space 20, a device which requires an elongated pipe is suitably placed. This pipe can be moved into and out of the device space 20 which is widely opened.

In the present embodiment, as an example of the device placed in the device space 20, a supercharger unit 130 is placed in the device space 20. The supercharger unit 130 includes a supercharger 131 which supercharges air. The motorcycle 100 includes an air supply duct 132 which supplies the air to the supercharger 131. The upstream end of the air supply duct 132 is placed at, for example, the front portion of the motorcycle 100 so that the air can be easily taken into the air supply duct 132 from outside by utilizing ram air. The air supply duct 132 extends in the vehicle length direction in a region that is outward relative to the front frame member 8. The air supply duct 132 extends into the device space 20 in a location that is below the rear frame member 9. The downstream end of the air supply duct 132 is connected to the supercharger 131.

The supercharger unit 130 includes an air supply chamber 133 into which the supercharged air (supplied air) is taken, and an upstream air supply passage 134 (see FIG. 2) through which the supplied air from the supercharger 131 is sent to the air supply chamber 133. The air supply chamber 133 contains a filter element (not shown) which cleans the supplied air, and also functions as an air cleaner box. The clean part of the air supply chamber 133 is in communication with the above-described combustion chamber via a downstream air supply passage 135. The downstream air supply passage 135 extends into the casing 103*a* via the rear wall of the cylinder head 114. A fuel is injected from an injector (not shown) to the interior of the downstream air supply passage 135 and/or the interior of the clean part of the air supply chamber 133. An exhaust pipe 140 extends downward from the front wall of the cylinder head 114, and is finally connected to a muffler (not shown) placed in the rear portion of the motorcycle 100. In a case where the supercharger 131 is a mechanical supercharger driven by the crankshaft, the layout of the exhaust pipe 140 is not complicated, and a region which is in the vicinity of the device space 20 is less affected by exhaust heat.

In addition to the supercharger unit 130, an Anti-lock Breaking System (ABS) unit can be placed in the device space 20. The ABS unit includes a casing connected to one or more pipes through which brake oil is flowed. In a case where this casing is placed in the device space 20, the pipe can be moved into or out of the device space 20 through an opened region that is below the rear frame member 9.

The rear end portion of the rod-like frame member constituting the rear frame member 9 is welded to the outer peripheral surface of the joint member 21 constituting the bent section 6. A nut 22 protrudes rearward from the outer peripheral surface of the joint member 21. The nut 22 is used to couple the upper portion of the front end of the rear frame 4 to the main frame 3 by use of a fastener member 83 such as a bolt. The downward extension section 7 is welded to the outer peripheral surface of the joint member 21 and extends in the downward direction.

Figure 4:
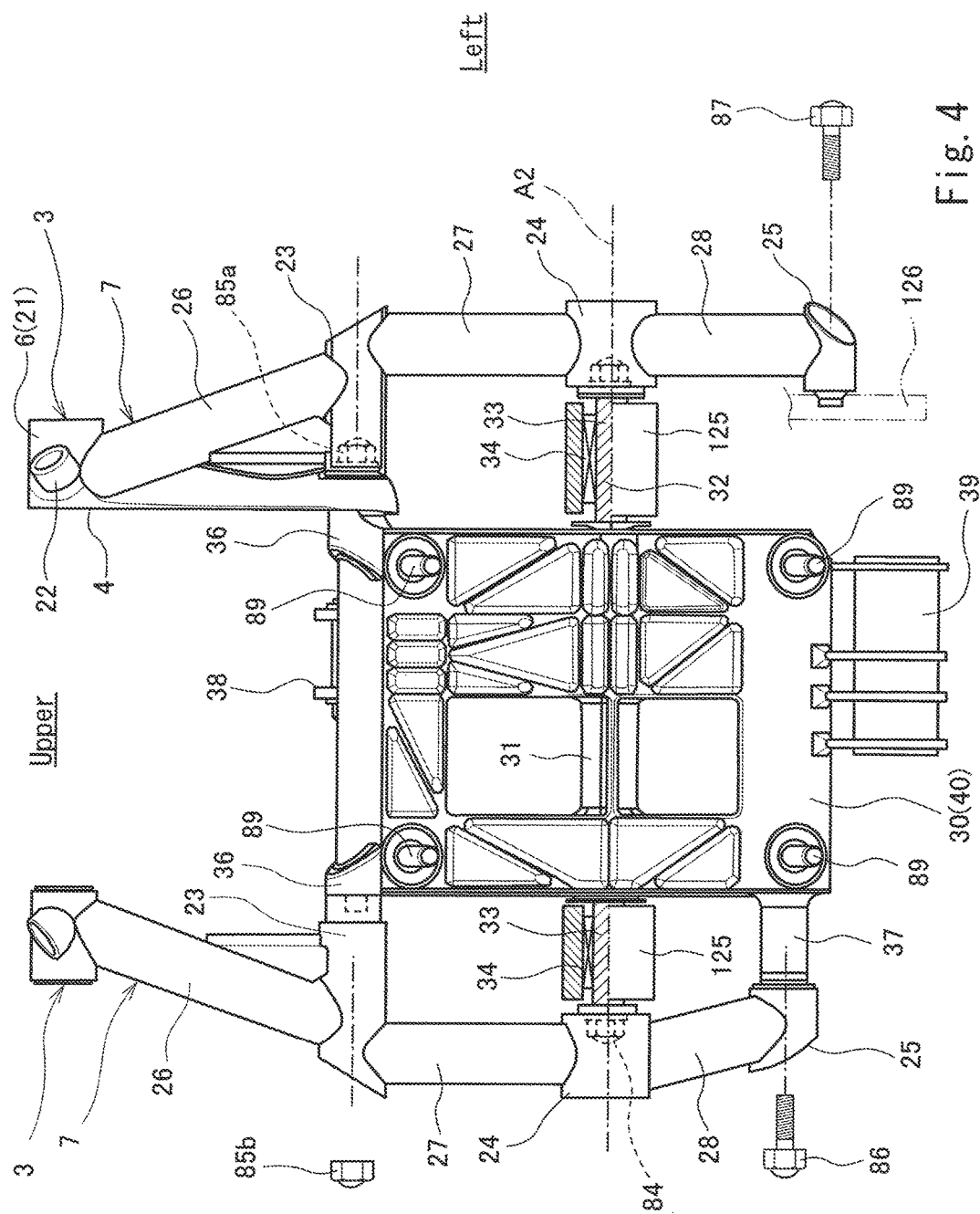
FIG. 4 is a front view of downward extension sections.

FIG. 4 is a front view of the downward extension sections 7. As shown in FIG. 4, each of the downward extension sections 7 includes a plurality of joint members 23 to 25 which are arranged to be spaced apart from each other in the vehicle height direction, and a plurality of rod-like frame members 26 to 28 connecting the joint members which are adjacent in the vehicle height direction. The upper frame member 26 extends downward from the outer peripheral surface of the joint member 21 constituting the bent section 6, and is connected to the outer peripheral surface of the upper joint member 23. The intermediate pipe member 27 extends downward from the outer peripheral surface of the upper joint member 23 and is connected to the upper portion of the outer peripheral surface of the intermediate joint member 24. The lower frame member 28 extends downward from the outer peripheral surface of the intermediate joint member 24 and is connected to the outer peripheral surface of the lower joint member 25.

Each of the downward extension sections 7 constitutes the rear portion of each of the main frames 3. The pair of downward extension sections 7 are detachably coupled to each other in the vehicle width direction by the above-described coupling member 30. In the present embodiment, the coupling member 30 has a substantially rectangular plate shape. In a state in which the two surfaces of the coupling member 30 face the front and the rear, respectively, the coupling member 30 is coupled to the main frames 3.

The coupling member 30 has a shaft insertion hole 31 penetrating therethrough in the vehicle width direction. A pivot shaft 32 is inserted into the shaft insertion hole 31. The right end portion of the pivot shaft 32 is formed with a male thread, while the left end portion of the pivot shaft 32 is formed with a bolt head portion. The pivot shaft 32 is inserted into the left intermediate joint member 24 from outside in the vehicle width direction, and through the shaft insertion hole 31. In a state in which the male thread protrudes into the right intermediate joint member 24, the bolt head portion is butted with the inner side surface of the left intermediate joint member 24. The male thread is threadingly engaged with a fastener member 84 such as a nut, from outside in the vehicle width direction, in the interior of the intermediate joint member 24, and thus the pivot shaft 32 is coupled to the main frames 3. Alternatively, the pivot shaft 32 may be inserted from the right and the fastener member 84 may be provided at a left side. The center axis of the pivot shaft 32 constitutes the above-described pivot axis A2. The front end portion of the swing arm 107 includes a pair of bosses 125 placed in the vehicle width direction. The bosses 125 are externally fitted to journals 33 of the pivot shaft 32, which are located between the main frames 3 and the coupling member 30, respectively, and thereby are rotatably supported around the pivot axis A2. A bearing structure 34 is interposed between the inner peripheral surface of each of the bosses 125 and the outer peripheral surface of the corresponding journal 33, and serves to bear a load generated when the swing arm 107 is pivoted.

The coupling member 30 includes an upper frame hole 36, and a lower frame hole 37. The upper frame hole 36 includes a pair of right and left frame holes. The pair of upper frame holes 36 extend in the vehicle width direction, in a location which is above the shaft insertion hole 31, or to be precise, at the upper edge portion of the coupling member 30. The right and left upper joint members 23 are made to overlap with the upper frame holes 36, respectively, in the vehicle width direction, and are placed outward in the vehicle width direction relative to the upper frame holes 36, respectively. A fastener member 85a such as a bolt which is elongated in the vehicle width direction, is inserted into the left upper joint member 23, from outside in the vehicle width direction, extends through the upper frame holes 36, and protrudes into the right upper joint member 23. The coupling member 30 is detachably coupled to the main frames 3 in such a manner that a fastener member 85b such as a nut is inserted into the right upper joint member 23 from outside in the vehicle width direction, and is engaged with the right end portion of the fastener member 85a. The left end portion of the fastener member 85a includes a head portion. The fastener member 85a is supported on the seat surface in the interior of the left upper joint member 23. The fastener member 85b is supported on the seat surface in the interior of the right upper joint member 23. Alternatively, the fastener member 85a may be inserted from the right and the fastener member 85b may be provided at a left side. The lower portion of the front end of the rear frame 4 is sandwiched between the coupling member 30 and the upper joint member 23. The coupling member 30 is fastened to the main frames 3 by use of the fastener members used to fasten the rear frames 4 to the main frames 3, respectively.

The lower frame hole 37 extends in the vehicle width direction, in a location that is below the shaft insertion hole 31, or to be precise, at the lower edge portion of the coupling member 30. The lower frame hole 37 is provided in the coupling member 30 only on a second side (e.g., right side) in the vehicle width direction. The lower joint member 25 located on the first side is made to overlap with the lower frame hole 37 in the vehicle width direction. The coupling member 30 is detachably coupled to the main frames 3 in such a manner that a fastener member 86 such as a bolt is inserted into the lower joint member 25 located on the first side, from outside in the vehicle width direction, and is engaged with the lower frame hole 37.

In contrast, the lower joint member 25 located on the first side (.e.g., left side) in the vehicle width direction is coupled to a stand bracket 126 to which a side stand 127 is pivotably mounted, by use of a fastener member 87 such as a bolt (see FIG. 1), instead of the coupling member 30. The stand bracket 126 includes a forward protruding portion 126a protruding forward and overlapping with the lower rear portion of the casing 103a when viewed from the side. By inserting fastener members 88 such as bolts into the forward protruding portion 126a, from outside in the vehicle width direction, the casing 103a is also fastened to the stand bracket 126 (see FIG. 1).

The coupling member 30 is fastened to the rear portion of the casing member 103a of the drive unit 103 by use of a plurality of fastener members 89, such as bolts. The rear surface of the casing member 103a faces the front surface of the coupling member 30. The fastener members 89 are inserted into the coupling member 30 in a forward direction, from the rear of the coupling member 30, and are threadingly engaged with the rear portion of the casing member 103a.

The coupling member 30 includes a suspension mounting section 38 on a back surface thereof, for mounting the end portion of the rear suspension 108 (FIG. 1) to the vehicle body in such a manner that the rear suspension 108 is pivotable. The coupling member 30 has, at a lower edge portion thereof, a support hole 39 via which the lever structure (not shown) is supported on the vehicle body in such a manner that the lever structure is angularly displaceable.

The coupling member 30 functions as a second mount 40 for directly or indirectly coupling at least one of the rear suspension 108 (see FIG. 1) and the swing arm 107. In a case where the coupling member 30 is considered to be a part of the drive unit 103 as described above, the drive unit 103 includes the second mount 40. In the present embodiment, the rear suspension 108 is directly mounted to the suspension support section 38, and the swing arm 107 is indirectly coupled to the shaft insertion hole 31 via the pivot shaft 32 and the bearing structure 34. The second mount 40 is coupled to the rear suspension 108 and to the swing arm 107.

Turning back to FIG. 1, the second mount 40 is located rearward relative to the front frame member 8. The drive unit 103 extends forward from the second mount 40, then extends substantially upward along the cylinder axis A3 and is joined to the first mounts 10a, 10b of the front frame member 8. In contrast, each of the main frames 3 is configured in such a manner that the rear frame member 9 extends forward from the bent section 6 at the upper end of the downward extension section 7, and is connected to the front frame member 8.

In this structure, if the rear wheel 102 receives an impact from a road surface, this impact is input to the second mount 40 via the rear suspension 108 and the swing arm 107. The input load is received by the front frame members 8 via the drive unit 103. Thus, the load transmitted from the second mount 40 to the bent sections 6 and to the rear frame members 9 is alleviated. In particular, since each of the rear frame members 9 is placed between the first mounts 10a, 10b and the second mount 40, the rear frame member 9 is apart from a transmission path of the load. The drive unit 103 and the front frame members 8 of the vehicle body frame 1 receive the impact from the road surface. Therefore, the stiffness of the rear frame member 9 may be reduced. In other words, the rear frame member 9 may be configured to reduce a burden in the assembling operation of the motorcycle 100 as described above.

The coupling member 30 is mounted to the rear suspension 108 and the lever structure (not shown) as well as the swing arm 107 and the pivot shaft 32 supporting the swing arm 107. Therefore, by mounting the swing arm 107 and the rear suspension 108 to the coupling member 30 to construct a rear sub-assembly in advance, mounting of the swing arm 107 and the rear suspension 108 to the vehicle body frame 1 is completed by merely coupling the coupling member 30 and the pivot shaft 32 to the main frames 3 thereafter. In the present embodiment, since the second mount 40 is also coupled to the side stand 127, assembling of the motorcycle 100 can be carried out more easily.

The second mount 40 is coupled to the right and left main frames 3 (in particular, the downward extension sections 7) on both sides in the vehicle width direction. The second mount 40 is coupled to the engine 110 and supports the swing arm 107 in such a manner that the swing arm 107 is rotatable. In this structure, even if the main frames 3 have a distortion, it becomes possible to prevent the effects of misalignment of the main frames 3 with respect to the driving power transmission path from the engine 110 to the swing arm 107.

Since the right and left portions of the engine 110 are connected to the vehicle body frame 1, the stiffness of the vehicle body can be increased by the engine 110. In the present example, the engine 110 is coupled to the vehicle body frame 1 at plural locations which are spaced apart from each other in the direction perpendicular to the vehicle width direction, on the right and left sides of the front portion of the vehicle body frame 1. This makes it possible to further increase the stiffness.

Since the first mounts and the second mount are coupled to the engine 110, a force applied to the head pipe 2 and the swing arm 107 can be transmitted in the forward and rearward direction via the engine 110. By utilizing the engine 110 as a stiff member in this way, the stiffness of the vehicle body is not reduced, even when the stiffness of the frame member extending between the first mounts and the second mount is reduced.

The right and left rear frames connected to the main frames 3, respectively, are independent of each other. Compared to a case where a cross member is provided in the vicinity of portions at which the rear frames are connected to the main frames, respectively, deformation of the main frames 3 in these portions can be permitted.

INDUSTRIAL APPLICABILITY

The present invention can provide a vehicle body frame structure which can reduce a burden in the assembling operation of a vehicle, and is effectively used in a straddle-type vehicle such as a motorcycle and an all-terrain vehicle (ATV).

LIST OF REFERENCE CHARACTERS 1 vehicle body frame
2 head pipe
3 main frame
4 rear frame
7 downward extension section (pivot bracket member)
8 front frame member
9 rear frame member
10a, 10b first mounts
11 upper frame
12 lower frame
30 coupling member
40 second mount
100 motorcycle
103 drive unit
105 steering shaft
107 swing arm
108 rear suspension

The invention claimed is:

1. A vehicle body frame structure of a straddle vehicle comprising:
 a head pipe; and
 a pair of main frames extending rearward and outward in a vehicle width direction from the head pipe in such a manner that the main frames are spaced apart from each other in the vehicle width direction,
 wherein rear portions of the pair of main frames are detachably coupled to each other in the vehicle width direction via a coupling member,
 wherein the pair of main frames include a pair of front frame members including first mounts, respectively, to which a drive unit of the vehicle is mounted, and a pair of rear frame members located rearward relative to the front frame members, respectively, wherein the pair of rear frame members have a stiffness lower than that of the front frame members in the vehicle width direction, wherein the pair of main frames include a pair of pivot bracket members extending downward from rear end portions of the rear frame members, respectively, wherein the coupling member is placed between the pair of pivot bracket members, coupled to the pair of pivot bracket members, and coupled to a rear surface of the drive unit, and wherein a swing arm is mounted to the pair of pivot bracket members and the coupling member.

2. The vehicle body frame structure of the straddle vehicle according to claim 1, wherein each of the pair of front frame members includes a plurality of rod-shaped frames placed in different directions, the plurality of rod-shaped frames of one of the front frame members and the plurality of rod-shaped frames of the other front frame member are arranged along a pair of virtual planes extending rearward from the head pipe to be spaced apart from each other in the vehicle width direction from the head pipe, and the plurality of rod-shaped frames of each of the pair of front frame members are coupled to each other to form a trellis structure, and wherein each of the pair of rear frame members is constituted by a single rod-shaped frame extending rearward linearly from the front frame member.

3. The vehicle body frame structure of the straddle vehicle according to claim 1, wherein the pair of rear frame members extend independently of each other in such a manner that the rear frame members are permitted to be deformed inward in the vehicle width direction.

4. The vehicle body frame structure of the straddle vehicle according to claim 1, wherein the drive unit includes a second mount located rearward relative to the front frame members, and wherein the second mount is coupled to the pair of pivot bracket members via the coupling member, and a rear suspension is coupled to the coupling member.

5. The vehicle body frame structure of the straddle vehicle according to claim 4, wherein each of the rear frame members is placed between the first mount and the second mount in a vehicle length direction.

6. The vehicle body frame structure of the straddle vehicle according to claim 1, wherein each of the front frame members includes an upper frame extending rearward from an upper portion of the head pipe, a lower frame extending rearward from a lower portion of the head pipe, and a connection frame connecting the upper frame to the lower frame substantially vertically, and wherein each of the rear frame members extends continuously rearward from one of the upper frame and the lower frame.

7. The vehicle body frame structure of the straddle vehicle according to claim 1, wherein each of the first mounts is placed at an intermediate portion of the front frame member in a vehicle length direction.

8. The vehicle body frame structure of the straddle vehicle according to claim 1, wherein each of the first mounts includes a plurality of first mount members which are placed to be spaced apart from each other.

9. The vehicle body frame structure of the straddle vehicle according to claim 1, wherein a rear portion of the drive unit is mounted to the pair of pivot bracket members.

10. The vehicle body frame structure of the straddle vehicle according to claim 9, wherein the coupling member is placed between the pair of pivot bracket members and detachably coupled to the pair of pivot bracket members, and wherein the rear portion of the drive unit is fastened to the coupling member by use of a fastener member inserted into the coupling member in a vehicle length direction.

11. The vehicle body frame structure of the straddle vehicle according to claim 1, wherein the pair of rear frame members extend linearly from the pair of front frame members, respectively, and the pair of pivot bracket members extend linearly from the pair of rear frame members, respectively.

12. The vehicle body frame structure of the straddle vehicle according to claim 1, further comprising:

a pair of rear frames extending rearward from the pair of main frames, respectively, wherein the coupling member and the pivot bracket members are coupled to each other at locations where a pivot shaft is coupled, the swing arm being pivotally mounted to the pivot shaft, and at locations where the rear frames are coupled.

* * * * *